ively high.
United States Patent Office 3,408,306
Patented Oct. 29, 1968

3,408,306
METHOD OF CONTROLLING FOAMING
Francis J. Boylan, Wilmington, Del., assignor to Hercules Incorporated, a corporation of Delaware
No Drawing. Continuation-in-part of applications Ser. No. 828,051, July 20, 1959, and Ser. No. 19,990, Apr. 5, 1960. This application July 7, 1961, Ser. No. 122,395
The portion of the term of the patent subsequent to Feb. 5, 1980, has been disclaimed
9 Claims. (Cl. 252—321)

This is a continuation-in-part of my copending applications Ser. No. 828,051 filed July 20, 1959, now abandoned and Ser. No. 19,990 filed Apr. 5, 1960, now U.S. Patent No. 3,076,768.

This invention relates to improvements in processes for reducing or preventing foaming in aqueous systems.

Commercial silicone defoamers have proved very effective for abating foam in aqueous systems. However, they are subject to the disadvantage that the cost is relatively high.

A principal object of the invention is the provision of a process for reducing or preventing foaming in aqueous systems which can be practiced inexpensively and effectively utilizing compositions formed of readily available cheap materials.

This, as well as other objects of the invention, is accomplished by the employment of a defoaming composition comprising from about 80% to about 97% of certain water-insoluble hydrophobic organic liquids, from about 3% to about 20% of small, solid, normally hydrophilic particles having a hydrophobic surface suspended in the organic liquid, and from about 0.5% to about 5% of a surfactant, i.e., spreading agent, dissolved in the organic liquid, said percentages being based on the composition. If the water-insoluble hydrophobic organic liquid contains polar groups, the surfactant can be omitted from the composition.

Relatively small amounts of the composition have been found to be highly effective in suppressing or controlling foam formation. The compositions can be utilized as such or in the form of aqueous emulsions.

Having described the invention generally, the following examples are given to illustrate specific embodiments thereof.

EXAMPLE 1

Colloidal amorphous silica prepared by precipitation from sodium silicate solution and having a particle size less than 1 micron was exposed to methyl chlorosilane vapors until reaction at the surface of the silica was complete. Fifteen parts of the thus treated silica was ballmilled into 85 parts of a naphthenic mineral oil (Gulf Oil 560) until completely dispersed. Then 3.2 parts of single-pressed stearic acid (HYFAC 410) was dissolved in the mixture at 60° C. following which 1.9 parts of triethanolamine was added and stirred into the mixture.

The composition prepared as above described was evaluated as a defoamer in comparison with a well-known commercial silicone defoamer. This evaluation was carried out as follows. Two hundred fifty milliliters of concentrated black liquor (filtrate water from the first washer of an alkaline pulping system) was heated to 90° C. Two hundred parts per million of each of the commercial silicone defoamer and the defoamer prepared as above described was added to the above liquid in separate graduates. Each was shaken vigorously for periods of 10 seconds, 30 seconds and 1 minute. 0.5 cm. of foam developed in the liquid containing the commercial silicone defoamer, whereas no foam developed in the liquid containing the defoamer prepared in accordance with the invention.

EXAMPLE 2

Seven parts of a hydrophobic bentonite prepared by reacting bentonite with a long chain quaternary amine to produce a hydrophobic colloid was dispersed with rapid agitation in 80 parts of deodorized kerosene. Five parts of polyoxyethylene sorbitan tristearate (Tween 65) was dissolved in the above mixture following which the mixture was evaluated as a defoaming agent in accordance with the procedure described in Example 1. No foam developed in the liquid upon agitation for 10–15 seconds.

EXAMPLE 3

Fifteen parts of colloidal silica prepared by precipitation from sodium silicate solution and having a particle size less than 1 micron was dispersed in 85 parts of naphthenic mineral oil. To this was added 10.6 parts of a polymeric silicone fluid containing some unhydrolyzed chlorine-silicon bonds and the mixture ballmilled until thoroughly dispersed. Then 3.2 parts of stearic acid (HYFAC 410) was dissolved in the above mixture at 60° C. following which 1.9 parts of triethanolamine were added to the mixture. The composition was then evaluated as a defoamer as set forth in Example 1 and the results obtained were equivalent to the results obtained in Example 1.

EXAMPLE 4

A colloidal precipitated silica was sprayed with 10% by weight, based on the weight of silica, of a dimethylpolysiloxane oil having a viscosity of 50 centistokes. The resulting mixture was divided into halves which were labeled "A" and "B" for purposes of identification. Part A was heated for 1 hour at a temperature of 300° C. and then cooled. The resulting material was hydrophobic as shown by the fact that it floated when placed in water. Part B, which had not been subjected to the heat treatment, dispersed in the water and then slowly settled to the bottom.

Two defoamer compositions were prepared from the above treated silicas as follows: To 10 parts of each silica was added 90 parts of a mineral oil having a viscosity of about 12 cps., and each mixture was passed through a homogenizer at 3000 p.s.i. pressure. To each mixture was then added 2 parts of stearic acid with sufficient heating to cause its dissolution. The defoamer efficiency of each composition was tested by adding a drop to 200 ml. of fresh concentrated black liquor in a glass graduate at 90° C., vigorously agitating, and then measuring the height of the foam. No foam developed over the liquid containing the heat-treated silica defoamer (Part A) while three-fourths of an inch of foam developed over the liquid containing the silica defoamer which was not heat treated (Part B).

The compositions of the invention can be prepared from a variety of relatively inexpensive water-insoluble hydrophobic organic liquids. Exemplary of these are vegetable oils, mineral hydrocarbons including mineral oils, i.e., paraffin oils, naphthenic oils, kerosene and similar petroleum fractions. It is also possible to use water-insoluble hydrophobic liquids containing polar groups. Exemplary of these are fluorinated and chlorofluorinated hydrocarbons such as the liquid trifluoro vinyl chloride polymers; long chain alcohols such as nonyl alcohol, octyl alcohol, etc.; long chain amines such as octyl amine, nonyl amine, 2-ethyl-1-amino-heptane, etc.; and long chain esters such as diglycol laurate. Mixtures of two or more of the above hydrophobic liquids can also be used.

The hydrophobic solids contemplated for use herein are finely divided solid materials which are normally hydrophilic but which have been treated to render the surfaces thereof hydrophobic. Exemplary of the materials which can be used are silica, bentonite, diatomaceous earth (sold under the trademark "Celite"), talc, attapulgite, titanium dioxide, or, in fact, any cheap colloidal solid such, for example, as those disclosed in U.S. 2,795,545 which can be treated to render the surfaces of the particles hydrophobic. The hydrophobic solid particles utilized in the novel defoaming compositions of the invention will desirably have an average particle size of less than about 10 microns. Most preferred is an average particle size of from about 0.02 micron to about 1 micron. In order to obtain this size it is usually necessary to ball-mill either the solid in oil, or to air-mill or ball-mill the solid before addition to the oil.

Any suitable method can be used for treating the normally hydrophilic solids to impart hydrophobic characteristics to the surfaces thereof. Exemplary of such treatments are those described in U.S. 2,510,661, U.S. 2,589,705, U.S. 2,795,545, U.S. 2,870,109, and Canadian 572,427. Typical of these are treatments with methyl chlorosilane vapors, long chain amines, heating with silicone oil, and so on.

The third component of the composition is a surfactant material. Any anionic, cationic, or nonionic emulsifier can be used as the surfactant. Examples of suitable anionic emulsifiers are alkali metal, ammonium, and amine soaps; the fatty acid part of such soaps contains preferably at least 16 carbon atoms because soaps based on lauric and myristic acids have a great tendency to develop abundant foam. The soaps can also be formed "in situ"; in other words, a fatty acid can be added to the oil phase and an alkaline material to the aqueous phase.

Other examples of suitable anionic emulsifiers are alkali metal salts of alkyl-aryl sulfonic acids, sodium dialkyl sulfo-succinate, sulfated or sulfonated oils, e.g., sulfated castor oil; sulfonated tallow, and alkali salts of short chain petroleum sulfonic acids.

Examples of suitable cationic emulsifiers are salts of long chain primary, secondary, or tertiary amines, such as oleylamine acetate, cetylamine acetate, di-dodecyl-amine lactate, the acetate of aminoethyl-aminoethyl stearamide, dilauroyl triethylene tetramine diacetate, 1-aminoethyl - 2 - heptadecenyl imidazoline acetate; and quaternary salts, such as cetylpyridinium bromide, hexadecyl ethyl morpholinium chloride, and diethyl dodecyl ammonium chloride.

Examples of suitable non-ionic emulsifiers are condensation products of higher fatty alcohols with ethylene oxide, such as the reaction product of oleyl alcohol with 10 ethylene oxide units; condensation products of alkylphenols with ethylene oxide, such as the reaction product of isooctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethylene glycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide, mannitan monopalmitate reacted with 10 to 15 molecules of ethylene oxide; long chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). A combination of two or more of these emulsifiers may be used; e.g., a cationic may be blended with a nonionic or an anionic with a nonionic.

The proportions of ingredients in the compositions of the invention can be varied widely. In general, defoaming efficiencies appear to increase with increasing proportions of solids. However, when the proportion of solids is too high, handling difficulties are encountered. Therefore, in order to retain fluidity of the product to allow ease in handling during use, the proportion of solids should not exceed about 20% and preferably about 15% by weight of the composition. It is possible to use as little as 3% of solids although it is preferred to use at least about 10%.

The proportion of water-insoluble hydrophobic organic liquid can vary from about 97% to about 80% of the composition. The preferred range of organic liquid content is from about 85% to about 90%.

The amount of surfactant material used will depend on the particular composition and the particular surfactant. In some cases as little as 0.5% by weight, based on the weight of the composition, can be used. Generally, however, it will be desirable to use at least about 2% of this material. In most cases not more than about 5% will be required. The preferred range is from about 1% to about 3%. As previously indicated, when a water-insoluble hydrophobic organic liquid containing polar groups is utilized, it is not necessary to include a surfactant material in the composition.

The compositions of the invention can be utilized as such by merely adding a small amount, i.e., at least about one part per million, to the aqueous system in which control of foaming is desired. There is, of course, no upper limit on the amount which is added except for its expense. In general, however, there is no practical advantage to be gained in adding the compositions in an amount greater than about 1.0%. Alternatively, these compositions can be converted to aqueous emulsions by adding water and an emulsifying agent and then vigorously agitating, usually by passage through a colloid mill, or homogenizer. Any suitable emulsifying agents, such as a mixture of an equal weight percent of sorbitan monostearate and polyoxyethylene sorbitan monostearate, can be utilized for the purpose. From about 5% to about 10% of the emulsifier based on the oil phase will usually suffice. The amount of water utilized in the preparation of these emulsions can vary from about 50% to about 70% based on the emulsion.

The defoamer compositions of the present invention are highly advantageous because of their low cost and high efficiencies which are equivalent to and in some cases surpass those of very expensive prior art defoamers costing many times as much. Moreover, the defoamer compositions of the invention retain their efficiencies in a given system much longer than most other commercial defoamers.

What I claim and desire to protect by Letters Patent is:

1. The method of controlling foaming in an aqueous system which comprises adding thereto a small amount of a defoaming composition comprising from about 80% to about 97% of a water-insoluble hydrophobic organic liquid selected from the group consisting of vegetable oils, mineral hydrocarbons, fluorinated hydrocarbons, long chain alcohols, long chain esters and long chain amines, from about 3% to about 20% of small solid normally hydrophilic particles selected from the group consisting of silica particles, bentonite particles, diatomaceous earth particles, talc particles, attapulgite particles and titanium dioxide particles which have been treated to render the surface thereof hydrophobic suspended in the organic liquid, and from about 0% to about 5% of a surfactant, said percentages being based on the composition.

2. The method of controlling foaming in an aqueous system which comprises adding thereto a small but foam-inhibiting amount of a defoaming composition comprising from about 80% to about 97% of a water-insoluble hydrophobic organic liquid selected from the group consisting of vegetable oils, mineral hydrocarbons, fluorinated hydrocarbons, long chain alcohols, long chain esters and long chain amines, from about 3% to about 20% of small solid normally hydrophilic particles selected from the group consisting of silica particles, bentonite particles, diatomaceous earth particles, talc particles, attapulgite particles and titanium dioxide particles which have been treated to render the surface thereof hydrophobic suspended in the organic liquid, and from about 0.5% to about 5% of a surfactant dissolved in the oil, said percentages being based on the composition.

3. The method in accordance with claim 2 in which the small normally hydrophilic particles are silica particles which have been treated to render the surface thereof hydrophobic.

4. A method in accordance with claim 2 in which the small normally hydrophilic particles are composed of finely divided silica which has been treated with methyl chlorosilane vapors to render the surface thereof hydrophobic.

5. A method in accordance with claim 2 in which the small normally hydrophilic particles are composed of finely divided silica which has been heated with a silicone oil to render the surface thereof hydrophobic.

6. A method in accordance with claim 2 in which the water-insoluble hydrophobic organic liquid is a mineral oil.

7. A method in accordance with claim 2 in which the water-insoluble hydrophobic organic liquid is kerosene.

8. The method of controlling foaming in an aqueous system which comprises adding thereto an aqueous emulsion containing, as the disperse phase, a composition comprising from about 80% to about 97% of a water-insoluble hydrophobic organic liquid selected from the group consisting of vegetable oils, mineral hydrocarbons, fluorinated hydrocarbons, long chain alcohols, long chain esters and long chain amines, from about 3% to about 20% of small solid normally hydrophilic particles selected from the group consisting of silica particles, bentonite particles, diatomaceous earth particles, talc particles, attapulgite particles and titanium dioxide particles which have been treated to render the surface thereof hydrophobic suspended in the organic liquid, and from about 1% to about 5% of a surfactant dissolved in the oil, said percentages being based on the composition.

9. The method of controlling foaming in an aqueous system which comprises adding thereto a small amount of defoaming composition consisting essentially of from about 80% to about 97% of a water-insoluble hydrophobic organic liquid selected from the group consisting of vegetable oils, mineral hydrocarbons, fluorinated hydrocarbons, long chain alcohols, long chain esters and long chain amines, and from about 3% to about 20% of small, solid, normally hydrophilic particles selected from the group consisting of silica particles, bentonite particles, diatomaceous earth particles, talc particles, attapulgite particles and titanium dioxide particles, which have been treated to render the surface thereof hydrophobic, suspended in the organic liquid.

References Cited

UNITED STATES PATENTS

| | | | |
|---|---|---|---|
| 2,894,913 | 7/1959 | Sullivan et al. | 252—358 |
| 2,306,222 | 12/1942 | Patnode | 117—106 |
| 2,412,470 | 12/1946 | Norton | 117—106 |
| 2,773,041 | 12/1956 | Larsen | 252—358 |
| 2,829,112 | 4/1958 | Solomon | 252—358 |

LEON D. ROSDOL, *Primary Examiner.*